United States Patent [19]

Yen et al.

[11] Patent Number: 5,426,561
[45] Date of Patent: Jun. 20, 1995

[54] HIGH ENERGY DENSITY AND HIGH POWER DENSITY ULTRACAPACITORS AND SUPERCAPACITORS

[75] Inventors: Shiao-Ping S. Yen, Altandena; Carol R. Lewis, La Canada, both of Calif.

[73] Assignee: The United States of America as represented by the National Aeronautics and Space Administration, Washington, D.C.

[21] Appl. No.: 221,973

[22] Filed: Mar. 31, 1994

Related U.S. Application Data

[63] Continuation of Ser. No. 953,391, Sep. 29, 1992, abandoned.

[51] Int. Cl.$^6$ .................. H01G 9/155; H01G 9/038
[52] U.S. Cl. ........................ 361/502; 361/505; 361/522; 361/541
[58] Field of Search ............... 361/502, 503, 504, 505, 361/511, 512, 522, 530, 541; 29/25.03

[56] References Cited

U.S. PATENT DOCUMENTS

| | | | |
|---|---|---|---|
| 4,170,812 | 10/1979 | Rayno | 29/25.42 |
| 4,313,084 | 1/1982 | Hosokawa et al. | 361/502 |
| 4,323,950 | 4/1982 | Bernard | 361/516 |
| 4,327,400 | 4/1982 | Muranaka et al. | 361/502 |
| 4,408,259 | 10/1983 | Muranaka et al. | 361/502 |
| 4,442,473 | 4/1984 | Holtzman et al. | 361/275 |
| 4,480,286 | 10/1984 | Whitman et al. | 361/314 |
| 4,480,290 | 10/1984 | Constanti et al. | 361/512 |
| 4,538,208 | 8/1985 | Shedigian | 361/319 |
| 4,562,511 | 12/1985 | Nishino et al. | 361/502 |
| 4,670,814 | 6/1987 | Matsui et al. | 361/274 |
| 4,730,239 | 3/1988 | Currie et al. | 361/502 |
| 4,731,705 | 3/1988 | Velasco et al. | 361/502 |
| 4,734,821 | 3/1988 | Morimoto et al. | 361/527 |
| 4,768,130 | 8/1988 | Bernard et al. | 361/323 |
| 4,862,328 | 8/1989 | Morimoto et al. | 361/502 |
| 4,877,695 | 10/1989 | Cipriano et al. | 429/102 |
| 5,047,899 | 9/1991 | Bruder | 361/502 |
| 5,055,975 | 10/1991 | Behrend | 361/527 |
| 5,079,674 | 1/1992 | Malaspina | 361/502 |
| 5,085,955 | 2/1992 | Cipriano | 429/102 |
| 5,086,374 | 2/1992 | MacFarlane et al. | 361/525 |
| 5,135,618 | 8/1992 | Saiki et al. | 205/171 |

FOREIGN PATENT DOCUMENTS

| | | | |
|---|---|---|---|
| 62-58525 | 12/1987 | Japan | 361/502 |
| 0265414 | 11/1988 | Japan | 361/502 |

Primary Examiner—Bruce A. Reynolds
Assistant Examiner—Gregory L. Mills
Attorney, Agent, or Firm—John H. Kusmiss; Thomas H. Jones; Guy M. Miller

[57] ABSTRACT

Ultracapacitor and supercapacitor designs wherein two discrete metal film current collectors of the prior art, one for each of the cathode and anode, are replaced by a single thin polymer film. The polymer film is typically several microns thick and metallized on both sides. The thickness of the metallization is varied from several hundred to several thousand Ångstroms depending upon the particular application. This metallization serves as the positive and negative electrodes (current collectors) which are spatially separated by the polymer dielectric film. The resulting reduction of volume increases the volumetric energy density and the reduction of mass increases the gravimetric energy density. The electrolyte solvent/salt system can be selected to provide useful individual cell voltages as high as 5 volts. The voltage is limited only by the electrolytic stability of the solvent and salt. Ultracapacitors fabricated in accordance with the present invention may have energy densities exceeding 10 watt-hours per kilogram and volumetric energy densities exceeding 15 watt-hours per liter. Values which are yet higher are feasible with supercapacitors fabricated in accordance with the present invention.

18 Claims, 2 Drawing Sheets

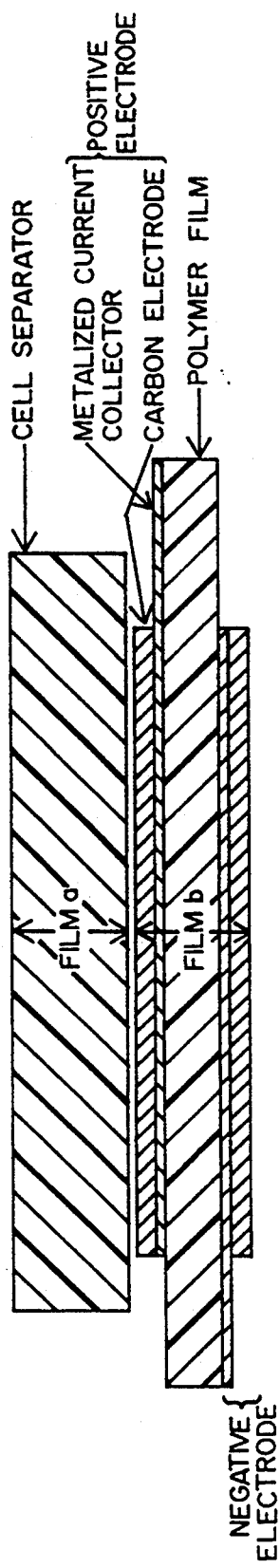
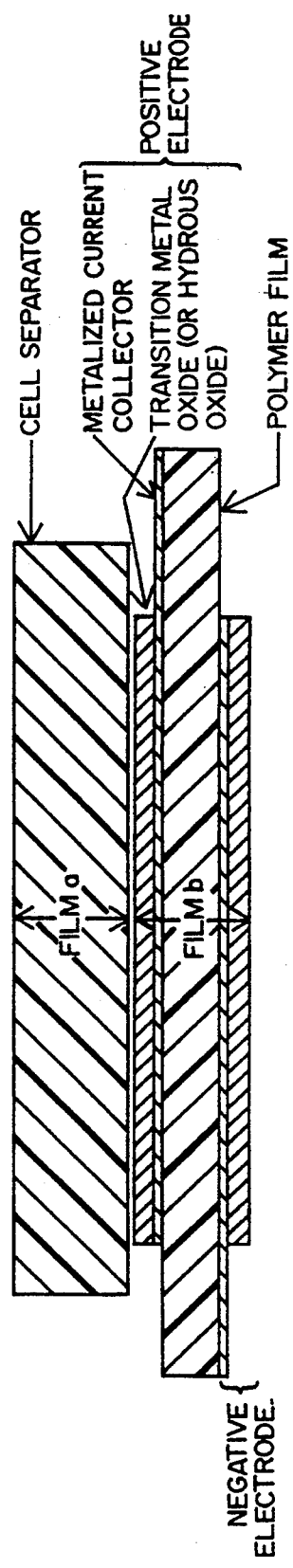
FIG. 1
FIG. 4

HIGH ENERGY DENSITY AND HIGH POWER DENSITY ULTRACAPACITORS AND SUPERCAPACITORS

This application is a continuation of application Ser. No. 07/953,391, filed Sep. 29, 1992, which is now abandoned.

BACKGROUND ART

There has been a recently renewed interest in vehicle propulsion systems in which stored electrical energy is the primary or sole source of energy. Of course, one immediately thinks of batteries as the most likely such energy source. Unfortunately, batteries are generally limited in their capability for meeting transient high power density requirements. Accordingly, the performance requirements for batteries to be used in electric vehicle propulsion systems can be significantly ameliorated by also using capacitors as supplemental and more flexible energy storage devices to supplement battery power when transient high power densities are required, thereby permitting load leveling. Of course in vehicle propulsion systems, as well as other portable pulse power device applications, the weight and volume of the power source, batteries and capacitors must be minimized to improve operating efficiencies and reduce the time between required access to stationary power supplies for recharging batteries and the like. Accordingly, conventional capacitors which are designed without any significant concerns for weight and volume efficiencies are unacceptable for such applications. Even recent technological advances in capacitors such as aluminum electrolytic capacitors, tantalum capacitors and ceramic capacitors do not satisfy the extremely high energy density and power density requirements as well as voltage flexibility that are needed in modern high pulse power applications. Attempts at meeting such special energy storage applications have resulted in the development of what are known as ultracapacitors and supercapacitors. Ultracapacitors and supercapacitors are two types of electric double-layer capacitors, utilizing ultrathin porous electrodes which in turn encapsulate small quantities of electrolyte. There are two distinctions between the two. First, supercapacitors display enhanced charge storage due to Faradaic charge transfer in addition to the double layer effect. Second, the cathode material differs in the two classes of devices. Ultracapacitors which are presently available commercially contain two carbon electrodes composed of high surface area carbon mixed with a binder. Each electrode is supported by a discrete metal film or grid which is several microns thick and which serves as a current collector. The cathode and anode are separated by an insulating cell separator. The entire structure is permeable and filled with an aqueous or nonaqueous electrolyte mixture. Supercapacitors, which are currently available only in the laboratory, are structurally analogous except that the carbon electrode of the ultracapacitor is replaced by an electrode composed of transition metal oxide or hydrous oxide. For example, supercapacitors known in the art have used electrodes composed of one or more oxides of ruthenium, tantalum, rhodium, iridium, cobalt, nickel, molybdenum, tungsten or vanadium deposited on a metal foil. The electrolyte may be acidic, basic or neutral, such as sulfuric acid, potassium hydroxide or sodium sulfate. Supercapacitors typically employ stacks of laminated electrodes consisting of a separator between the electrodes. Ion permeable membranes have been used as separators. The particular configuration depends upon the application. Unfortunately ultracapacitors which are currently commercially available have low volumetric and gravimetric energy densities, as well as low cell voltages. Supercapacitors are not yet commercially available at all. Neither existing ultracapacitors nor existing supercapacitors meet the requirements for incorporation into electric vehicle propulsion systems.

A recent search conducted in the U.S. Patent and Trademark Office indicates the following U.S. Pat. Nos. as being relevant in varying degrees to the invention disclosed herein.

4,179,812 Rayno
4,313,084 Hosokawa et al
4,323,950 Bernard
4,327,400 Muranaka et al
4,442,473 Holtzman et al
4,480,286 Whitman et al
4,480,290 Constanti et al
4,538,208 Shedigian
4,670,814 Matsui et al
4,731,705 Velasco et al
4,734,821 Morimoto et al
4,768,130 Bernard et al
5,047,899 Bruder
5,055,975 Behrend
5,079,674 Malaspina
5,086,374 MacFarlane et al Of the foregoing patents, the following provide the most relevant disclosure with respect to the invention claimed herein.

U.S. Pat. No. 4,313,084, to Hosokawa et al is directed to several embodiments of laminated capacitor structures comprising a plurality of double layer unit capacitor cells, each having a high withstand voltage, with voltage equalization between cells provided by a pattern of resistors on a flexible sheet wrapped around the laminated capacitor assembly before being accommodated in an outer casing. The unit cell of the double layer capacitor comprises paste electrodes of activated carbon in an electrolyte solution sandwiched between disc conductive separators with a porous separator between the electrodes enclosed by a ring-shaped nonconductive gasket. The assembly of seven unit cells in series with terminal leads of resistors clamped between the unit cells is shown. A four-cell assembly is also shown.

U.S. Pat. No. 5,079,674, to Malaspina is directed to a method of fabricating a supercapacitor electrode by absorbing metal oxides onto a high surface area material such as activated carbon. Soluble metal salts 10 of ruthenium, tantalum, rhodium, iridium, cobalt, nickel, molybdenum, tungsten, or vanadium are adsorbed onto the conductive carbon matrix. The salts are converted to oxides and the matrix is mixed with a resin, formed into sheets and then laminated onto an absorbent separator. A second electrode sheet can be laminated onto the opposing side of the separator. The assembly can be cut to size and stacked to form supercapacitors. The stack is connected to leads placed in a suitable container and activated by adding a liquid electrolyte.

U.S. Pat. No. 5,086,374, to MacFarlane et al is directed to an aprotic electrolyte for an electrolytic capacitor, double capacitor, or battery comprising at least one salt, one acid, and an aprotic solvent. The capacitor anode and cathode can be any suitable metal in the form of a foil, or formed in situ by painting, sputtering, evaporating, or depositing on the spacer, or for low voltage, low frequency energy storage, a double layer utilizing a mass of conductive carbon particles can be formed on the spacer. The salt is selected from the group consisting of alkali metal salts, transition metal salts, ammonium and ammonium derivative salts, zinc salts, cadmium salts, mercury salts, lead salts, bismuth salts, and thallium salts, or may be partial esters of at least one of boric sulfuric and phosphoric acid reacted with compounds containing an alcohol group or alternately may be an alkali metal tetrafluoroborate. The acid may be selected from the group consisting of perchloric acid, tetrafluoroboric acid, thiocyanic acid, trifluoromethanesulphonic acid, and haloid acids. The aprotic solvent in the electrolyte is made from a solvent with polar groups capable of imparting to the solvent a high solvation power, but must not include those having labile hydrogen atoms.

U.S. Pat. No. 4,327,400, to Muranaka et al is directed to a double layer capacitor comprising a carbon electrode material with a polyvinyl pyrrolidone binder having a distinct feature of being very thin. The capacitor comprises two polarization electrodes and a separator therebetween. The electrodes are formed by carbon mixed with a binder applied to an expanded aluminum and the separator is impregnated with an electrolyte. The high ionic electrolyte is preferably obtained by mixing alkaline metal salts or ammonium salt and nitriles, sulfoxides, anides, pyrrolidones, carbonates, or lactones as a solvent.

U.S. Pat. No. 4,670,814, to Matsui et al is directed to a high-voltage capacitor constructed from a plurality of circular or flatly formed capacitor elements arranged in rows. The capacitor elements are insulated with synthetic resin before or at the time of molding the insulation layer. The reference is of interest in that it discloses a high-voltage bank of capacitor elements.

STATEMENT OF THE INVENTION

The present invention provides new ultracapacitor and supercapacitor designs wherein two discrete metal film current collectors of the prior art, one for each of the cathode and anode, are replaced by a single thin polymer film. The polymer film is typically several microns thick and metallized on both sides. The thickness of the metallization is varied from several hundred to several thousand Ångstroms depending upon the particular application. This metallization serves as the positive and negative electrodes (current collectors) which are spatially separated by the polymer dielectric film. The resulting reduction of volume increases the volumetric energy density and the reduction of mass increases the gravimetric energy density. The electrolyte solvent/salt system can be selected to provide useful individual cell voltages as high as 5 volts. The voltage is limited only by the electrolytic stability of the solvent and salt. The advantages of film capacitor manufacturing technology are incorporated, thereby permitting the fabrication of devices with high, as well as low, voltages and capacitances. This contrasts with traditional battery manufacturing technology, which does not permit such flexibility. The savings of weight and the ability to readily achieve high energy densities make ultracapacitors and supercapacitors fabricated in accordance with the present invention, potentially valuable components of electric vehicle propulsion systems or as energy sources for other pulse power device applications. The present invention uses lightweight component materials and higher-voltage electrode/electrolyte systems. In addition, the invention employs innovative design and manufacturing processes in order to produce a wide range of voltages extending anywhere from several volts to several hundred volts in a wide range of available capacitances. In fact, ultracapacitors fabricated in accordance with the present invention may have energy densities exceeding 10 watt-hours per kilogram, power densities exceeding one kilowatt per kilogram and volumetric energy densities exceeding 15 watt-hours per liter. Values which are yet higher are feasible with supercapacitors fabricated in accordance with the present invention.

Accordingly, it is therefore an object of the invention to provide ultracapacitors and supercapacitors which have energy densities and power densities which are higher than that available from ultracapacitors and supercapacitors of the prior art.

It is an additional object of the present invention to provide an ultracapacitor or supercapacitor design, the volume of which can be reduced by about three-fold as compared to the prior art and a gravimetric energy density which can be increased by over nine-fold as compared to the prior art.

It is still an additional object of the present invention to provide ultracapacitors and supercapacitors having extremely high energy and power densities by using polymer film capacitor manufacturing technology in a unique design which can be used to provide a wide range of capacitance and voltage ratings for supplementing battery power in electric vehicle propulsion systems as well as for providing power sources for power tools and the like.

BRIEF DESCRIPTION OF THE DRAWINGS

The aforementioned advantages and objects of the present invention, as well as additional advantages and objects thereof, will be more fully understood hereinafter as a result of a detailed description of a preferred embodiment in which:

FIG. 1 is a cross-sectional diagram of a 5 volt ultracapacitor unit fabricated in accordance with the present invention;

FIG. 4 is a partial cross-sectional diagram of a supercapacitor similar to FIG. 1 but illustrating the substitution of electrode materials.

DETAILED DESCRIPTION OF THE INVENTION

Figure 2:
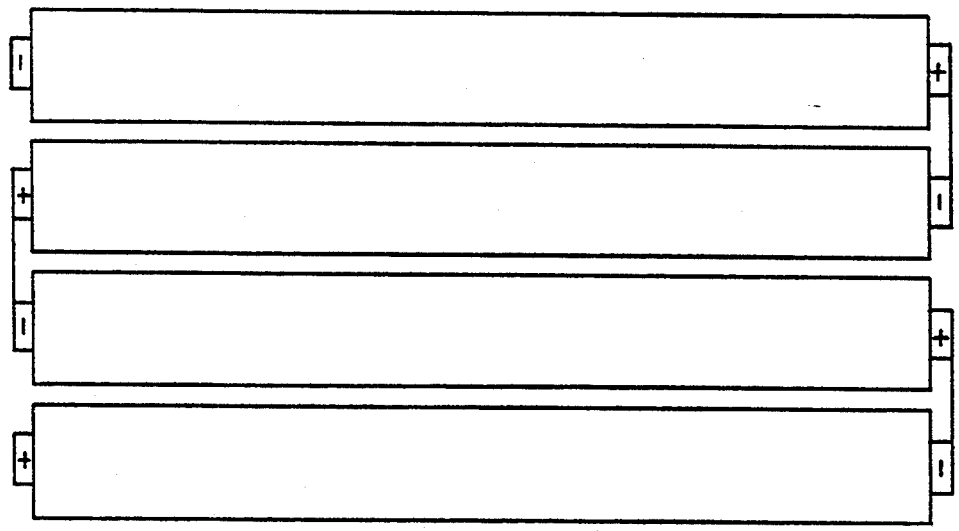
FIG. 2 is a front view of a medium-voltage ultracapacitor pack fabricated from a plurality of the units of FIG. 1.
Figure 3:
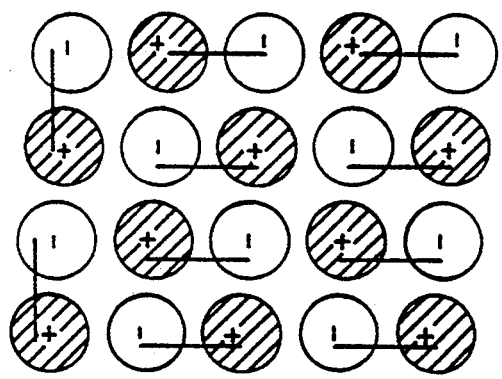
FIG. 3 is a top view of a high-voltage ultracapacitor bank, again fabricated using the units of FIG. 1.

Referring to the accompanying figures, it will be seen that FIGS. 1 through 3 are illustrative schematics of ultracapacitors for low, medium and high voltage applications, respectively. The structures for supercapacitors are analogous with the exception that the carbon electrodes are replaced by electrodes composed of transition metal oxides or hydrous oxides. Voltage ratings referred to in regard to the accompanying FIGs. will be understood to be for purposes of illustration only since they may be readily varied, as will be described hereinafter in more detail. Referring now first to the schematic cross-sectional diagram of FIG. 1, it will be seen that this figure illustrates an as-built, low-voltage ultracapacitor in accordance with the present invention. Film "a" is the insulating cell separator layer. Sandwich film "b" includes a total of five layers. The center layer is a thin film of capacitor-grade polymeric dielectric with high voltage breakdown strength. On each side of the polymer film, there is a layer of metal which is deposited directly on the film and serves as a current collector for both the cathode and anode. In turn, coated onto each side of the metal is a layer of high surface area carbon mixed with an elastomeric polymeric electrolyte binder. A carbon layer serves as the positive and negative electrodes. An "a" layer and a "b" layer are alternately stacked together using film capacitor manufacturing technology to generate a 5-volt device (when appropriate electrolyte salt and solvent are used) shown in FIG. 1.

FIG. 2 illustrates a front view schematic of a medium-voltage ultracapacitor pack. The illustration contains four 5-volt ultracapacitor units connected in series to generate a 20-volt ultracapacitor pack.

FIG. 3 illustrates a top view schematic of a high-voltage ultracapacitor bank; the illustration contains 20 five-volt ultracapacitor units connected in series to provide a 100-volt ultracapacitor bank. Voltages and power densities of this magnitude are suitable for load leveling applications and electric vehicle propulsion systems.

Referring again to FIG. 1, it will be seen that the new ultracapacitor of the present invention replaces the mass of metal current collector of the prior art ultracapacitors with lightweight metallized polymer film of high electrical breakdown strength. This film is typically several microns thick. The density of the polymer is typically less than one third that of the original metal. The metallization layer deposited on each side of the polymer film is very thin (i.e, between several hundred and several thousand Ångstroms), the desired thickness being determined by the particular application. One side is used as the negative current collector cathode and one side as the positive current collector anode. The outer surfaces of the metallization are coated with a mixture of high surface area carbon and an elastomeric polymer electrolyte binder. The binder enhances the mechanical and electrical properties of the carbon electrodes. A thin polymeric electrolyte film separator is placed between the cathode and the anode. This ion-conducting separator reduces cell resistance and allows for fast cell discharge times. A non-aqueous electrolyte solvent/salt system such as acetonitrile/tetrabutylammonium tetrafluoroborate is introduced into the electrochemical system. Such a cell can be operated at voltages of up to 5 volts. In addition, solvents such as propylene carbonate, propylene carbonate/dietheylcarbonate mixtures, 1, 3 dioxolane, tetrahydrofuran, and salts such as tetrabutyl ammonium, tetraphenyl borate, tetraethylphosphonium tetrafluoroborate and tetraethylammonium tetrafluoroborate, can also be used as electrolytes to achieve high cell voltages. The only voltage limiting factor is the oxidative/reductive stability of the solvent and salt. Conventional film capacitor winding technology may be used to make each high capacitance ultracapacitor cell in roll form.

The new supercapacitor of the present invention is structurally analogous to the new ultracapacitor described herein above except that the carbon electrode is replaced by an electrode composed of a transition metal oxide or hydrous oxide as shown in FIG. 4.

With an ultracapacitor or supercapacitor designed in accordance with the present invention, the volume can be reduced by about three-fold and the gravimetric energy density can be increased by over nine-fold as compared to the prior art. At the same time, the advantages of polymer film capacitor manufacturing technology are incorporated. These advantages include the following: the ability for large-scale, as well as small-scale fabrication, permitting the construction of devices with large, as well as small voltages and capacitances; the ability to incorporate a multicell configuration in which the overall voltage is easily varied by changing the number of cells; and the need for only a single case for the device, instead of one for each high capacitance cell, thus saving mass and the ability to readily vary the capacitance of any or all cells by changing the length of the electroactive film windings. This unique design can be used to produce ultracapacitors and supercapacitors with a wide range of capacitance and voltage ratings. Applications of small devices include, but are not limited to power sources for power tools. Applications of large devices include, but are not limited to, sources of high power to supplement battery power in electric vehicle propulsion systems.

Those having skill in the relevant art will now as a result of the applicants' teaching herein, perceive various modifications and additions which may be made to the invention. By way of example, the specific size, shape, voltage ratings and capacitance values of illustrative examples provided herein may be readily varied without deviating from the scope of the invention. Accordingly, all such modifications and additions are deemed to be within the scope of the invention which is to be limited only by the claims appended hereto and their equivalents.

We claim:

1. A capacitor comprising:
 a metalized polymer film having opposing surfaces;
 each said opposing surface being coated with a layer of metal forming a current collector;
 a pair of electrode layers, each of said electrode layers formed of a mixture of carbon and electrolyte binder, each of said electrode layers coated respectively onto each of said layers of metal; and
 an electrolyte in contact with said metal layers and with said carbon and binder mixture layers.

2. The capacitor recited in claim 1 wherein the thickness of said polymer film is less than ten microns and the thickness of said metal layer is less than 10,000 Angstroms.

3. The capacitor recited in claim 1 wherein said electrolyte binder comprises an elastomeric polymer.

4. The capacitor recited in claim 1 wherein said electrolyte comprises a non-aqueous solvent/salt system.

5. The capacitor recited in claim 4 wherein said solvent/salt system comprises acetonitrile tetrabutylammonium tetrafluoroborate.

6. The capacitor recited in claim 1 wherein said electrolyte comprises a solvent taken from the group consisting of propylene carbonate; propylene carbonate/diethylcarbonate; 1, 3 dioxolane; and tetrahydrofuran.

7. The capacitor recited in claim 1 wherein said electrolyte comprises a salt taken from the group consisting of tetrabutylammonium tetraphenylborate; tetraethylphosphonium tetrafluoroborate; and tetraethylammonium tetrafluoroborate.

8. The capacitor recited in claim 1 further comprising at least one polymeric film cell separator positioned adjacent at least one of said carbon and binder mixture layers.

9. A capacitor comprising:
a metalized polymer film having opposing surfaces;
each said opposing surface being coated with a layer of metal forming a current collector;
a pair of electrode layers, each of said electrode layers formed of material taken from the group consisting of transition metal oxides and hydrous oxides, each of said electrode layers coated respectively onto each of said layers of metal; and
an electrolyte in contact with said metal layers and with said group material layers.

10. The capacitor recited in claim 9 wherein the thickness of said polymer film is less than ten microns and the thickness of said metal layer is less than 10,000 Angstroms.

11. The capacitor recited in claim 9 wherein said electrolyte comprises a non-aqueous solvent/salt system.

12. The capacitor recited in claim 11 wherein said solvent/salt system comprises acetonitrile tetrabutylammonium tetrafluoroborate.

13. The capacitor recited in claim 9 wherein said electrolyte comprises a solvent taken from the group consisting of propylene carbonate; propylene carbonate/diethylcarbonate; 1, 3 dioxolane; and tetrahydrofuran.

14. The capacitor recited in claim 9 wherein said electrolyte comprises a salt taken from the group consisting of tetrabutylammonium tetraphenylborate; tetraethylphosphonium tetrafluoroborate; and tetraethylammonium tetrafluoroborate.

15. The capacitor recited in claim 9 further comprising at least one polymeric film cell separator positioned adjacent at least one of said carbon and binder mixture layers.

16. A capacitor comprising:
a plurality of cells each such cell having a metalized polymer film having opposed surfaces;
each of said opposed surfaces being coated with a layer of metal forming a current collector;
a pair of electrode layers, each of said electrode layers formed of an electrode material coated onto each of said metal layers;
an electrolyte in contact with said metal layers and with said electrode material layers; and
a polymeric film cell separator positioned between the electrode materials of adjacent cells.

17. The capacitor recited in claim 16 wherein said electrode material comprises a mixture of carbon and electrolyte binder.

18. The capacitor recited in claim 16 wherein said electrode material comprises a material taken from the group consisting of transition metal oxides and hydrous oxides.

* * * * *